Patented Mar. 1, 1932

1,847,709

UNITED STATES PATENT OFFICE

WEBSTER E. BYRON BAKER, OF YORK HAVEN, PENNSYLVANIA

PROCESS OF MAKING SODIUM LIGNO-SULPHONATE

No Drawing.    Application filed April 7, 1923.  Serial No. 630,905.

One object of the present invention is to provide an industrially efficient and economical process of preparing from light or sulphite waste liquor a concentrated sulphite cellulose extract containing practically all of its basic constituents in the form of sodium, that is, sodium lignosulphonate. Another object of the present invention is to convert the last mentioned extract into a form suitable for use in the manufacture of leather and for other uses, for example, as a mordant for basic dyestuffs where tannic acid is now used. Another object of the invention is to recover the alkaline earth metals present in the extract for subsequent re-use in the manufacture of sulphite cooking acid used in the preparation of sulphite pulp.

In the practice of the invention the light liquor (sulphite waste liquor) is neutralized and concentrated to a density of about 30° Baumé or until it contains about 50% dry matter although in all cases the invention is not limited to any particular concentration. This concentrated extract is treated with a quantity of concentrated sodium carbonate solution chemically equivalent to the quantiy of alkaline earth metals contained in the extract. This results in the precipitation of practically all of the alkaline earth metals as insoluble carbonates which are separated from the extract by filtration. The sodium compound thus produced by double decomposition may be useful for some purposes. If it is desired to convert the extract into a form useful for tanning leather and for other like purposes, the extract may be acidified to the desired extent by the addition of some acid which does not ionize to any great extent, for example, acetic acid, using a molecular equivalent to the soda combined.

The calcium (and other alkaline earth metals) precipitated as carbonates can be reutilized in the preparation of sulphite cooking acid used in the cooking of the sulphite pulp (cellulose) by washing the precipitate, stirring it up with water, and supplying it to the acid system or by mixing it with cooking acid or bisulphite cooking liquor in its course of preparation, whereupon it is immediately dissolved as bisulphite, the carbon dioxide passing away as gas.

While in all cases not essential, good results can be obtained by collecting the waste or light liquors prior to neutralization and concentration and while still hot, filtering out fibers and solid materials in suspension and then pumping them through a fine spray nozzle or nozzles into the air in the form of a mist. When this is done gaseous impurities or components are volatilized and organic compounds are oxidized.

The light or waste sulphite liquor can be neutralized by the addition of milk of lime until the hydrogen ion concentration of the liquor is pH=9. There may also be added at this stage a small quantity of barium or strontium hydroxide solution and this can well be done in the last part of the neutralization procedure. The purpose is to precipitate as completely as possible any sulphuric acid ions present as sulphate and to remove the small quantity of sulphurous acid ions still present as sparingly soluble calcium sulphite. The last procedure is appropriate when it is essential that scale deposition or scale formation on the tubes and heating surfaces of the apparatus used in the subsequent concentration process be reduced as much as possible. Aside from the matter of purity of the product it is commercially possible to operate without the addition of barium or strontium or both.

The filtration and concentration of the neutralized light liquor may be effected as described in my application, Serial No. 539,284, that is to say, by subjecting it to sedimentation for a sufficient time to settle the major portion of the larger particles. The supernatant liquor is drawn off and passed through a filter capable of holding the finest precipitate. The form of filtration apparatus employed is not essential but good results can be attained by the use of a high speed centrifugal of the imperforate basket or bowl type. The resulting clear liquor is concentrated to about 50% solids content without decomposition. Decomposition is prevented by avoiding and minimizing the exposure of the liquid to high temperature, particularly as the concentration progresses. While any type of apparatus or method of obtaining these conditions may be employed, still it will be found advantageous and economical to do this in a multiple effect vacuum evaporator and of these the rapid film type is most desirable.

Instead of sodium carbonate use may be made of its equivalent potassium carbonate.

The fact that calcium and alkaline earth metals are recovered in the form of carbonates is important because in that form they are capable of re-utilization in making "cooking" acid for the manufacture of sulphite pulp.

The product of the described process is not claimed herein because it is claimed in my copending application Serial No. 630,604 in which there is also claimed a modified process for making substantially the same product.

It will be obvious to those skilled in the art that modifications may be made in details of procedure without departing from the spirit of the invention which is not limited as to those matters or otherwise than as the prior art and the appended claim may require.

I claim:

The process of making concentrated sulphite cellulose extract containing practically all of its salts in the form of compounds of sodium which comprises neutralizing waste sulphite liquor with an alkaline earth metal hydroxide and concentrating it removing substantially all sulphites and sulphates, treating said concentrated waste liquor with concentrated solution of sodium carbonate chemically equivalent to the quantity of alkaline earth metal contained in the extract thereby precipitating practically all of the alkaline earth metals as insoluble carbonates, leaving the sodium compound (sodium lignosulphonate) in the solution, removing the precipitated carbonates of the alkaline earth metal, and acidifying the solution with an organic acid which does not substantially ionize and which has a relatively low dissociation constant.

WEBSTER E. BYRON BAKER.